(12) United States Patent
Idzik et al.

(10) Patent No.: US 9,122,389 B2
(45) Date of Patent: Sep. 1, 2015

(54) APPARATUS AND METHOD PERTAINING TO THE STYLUS-INITIATED OPENING OF AN APPLICATION

(71) Applicant: Research In Motion Limited, Waterloo (CA)

(72) Inventors: Jacek S. Idzik, Kenilworth (CA); Peter Mankowski, Waterloo (CA); Cornel Mercea, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 203 days.

(21) Appl. No.: 13/739,098

(22) Filed: Jan. 11, 2013

(65) Prior Publication Data

US 2014/0198051 A1    Jul. 17, 2014

(51) Int. Cl.
*G06F 3/0488* (2013.01)
*G06F 3/0354* (2013.01)
*G06F 3/0484* (2013.01)

(52) U.S. Cl.
CPC .......... *G06F 3/0488* (2013.01); *G06F 3/03545* (2013.01); *G06F 3/0484* (2013.01)

(58) Field of Classification Search
CPC ........... G06F 3/01; G06F 3/017; G06F 3/033; G06F 3/0354; G06F 3/03545–3/03547; G06F 3/038; G06F 3/048; G06F 3/0481; G06F 3/04817; G06F 3/0482; G06F 3/0484; G06F 3/04842; G06F 3/0487–3/04886
USPC ................. 178/18.01, 19.01–19.07; 345/156, 345/173–179; 715/810–813, 863
See application file for complete search history.

(56) References Cited

U.S. PATENT DOCUMENTS

| | | | |
|---|---|---|---|
| 6,512,525 B1 | 1/2003 | Capps et al. | |
| 7,474,299 B1 | 1/2009 | O'Hara et al. | |
| 7,479,943 B1 | 1/2009 | Lunsford et al. | |
| 2001/0045949 A1 | 11/2001 | Chithambaram et al. | |
| 2004/0078792 A1 | 4/2004 | Chew | |
| 2005/0028110 A1 | 2/2005 | Vienneau et al. | |
| 2009/0006991 A1 | 1/2009 | Lindberg et al. | |
| 2009/0258638 A1* | 10/2009 | Lee | 345/173 |
| 2011/0316797 A1* | 12/2011 | Johansson | 345/173 |
| 2012/0023573 A1 | 1/2012 | Shi | |
| 2012/0133601 A1* | 5/2012 | Marshall et al. | 345/173 |

FOREIGN PATENT DOCUMENTS

WO      2010/040670 A2    4/2010

OTHER PUBLICATIONS

Extended European Search Report from related European Patent Application No. 13150918.4 dated Jun. 11, 2013; 7 pages.

* cited by examiner

*Primary Examiner* — Nathan Danielsen
(74) *Attorney, Agent, or Firm* — Jose Gutman; Fleit Gibbons Gutman Bongini & Bianco P.L.

(57) ABSTRACT

A particular application is pre-associated with the detection of a predetermined stylus action that occurs while a given electronic device is in a standby mode of operation. Upon then detecting that predetermined stylus action these teachings provide for responsively opening that particular application. By one approach this opening of the particular application occurs in conjunction with switching the electronic device from the standby mode of operation to the active mode of operation. The pre-association can be based, at least in part, upon an automatic association based upon identifying the most-used application for the electronic device. As another example, the pre-association can be based, at least in part, upon a specific user-based selection.

15 Claims, 3 Drawing Sheets

APPARATUS AND METHOD PERTAINING TO THE STYLUS-INITIATED OPENING OF AN APPLICATION

FIELD OF TECHNOLOGY

The present disclosure relates to styli employed as a user interface to a corresponding electronic device.

BACKGROUND

Various styli are known and typically serve in conjunction with a scribing surface that is configured to work with a corresponding stylus. Generally speaking, a stylus is typically a hand-held writing utensil that often (but not exclusively) has a pencil-like elongated form factor and that includes at least one pointed end configured to interact with the scribing surface. Using a stylus as an input mechanism with, for example, a display offers a variety of advantages over a fingertip including the opportunity for increased precision as well as an expression modality that accords with the user's own past experience with a pencil or pen.

That said, there are times when a finger-based user-interface modality may be preferred, at least by some users. In many such cases the user has corresponding preferences. That is, a given user might prefer to use a stylus-based approach with one application but a finger-based approach with another application.

Many electronic devices have both an active mode of operation and a standby mode of operation. Generally speaking, during the active mode of operation the electronic device is "on" in that the electronic device is presently ready to respond to a full panoply of user inputs and instructions. The standby mode of operation typically serves, however, to greatly reduce the electronic device's use of power. Accordingly, during the standby mode of operation the ability of the electronic device to provide information and to respond to user inputs is reduced in some meaningful way. Often (though not always), for example, the electronic device's display will be blank or even "off" and at least some user-input interfaces will not serve in their usual manner.

The specifics of what constitutes a standby mode of operation varies from one device to the next. Some devices may even support a number of different standby modes of operation. Again, however, a device's standby mode of operation is characterized by a reduced quiescent consumption of power as compared to the quiescent consumption of power during the active mode of operation, and the user interface itself offers reduced opportunities for user input.

It is known in the art to awaken an electronic device from a standby mode using a stylus. While useful in and of itself, in many cases present practices in these regards do not meet all potential user needs in all application settings.

DETAILED DESCRIPTION

Figure 1:
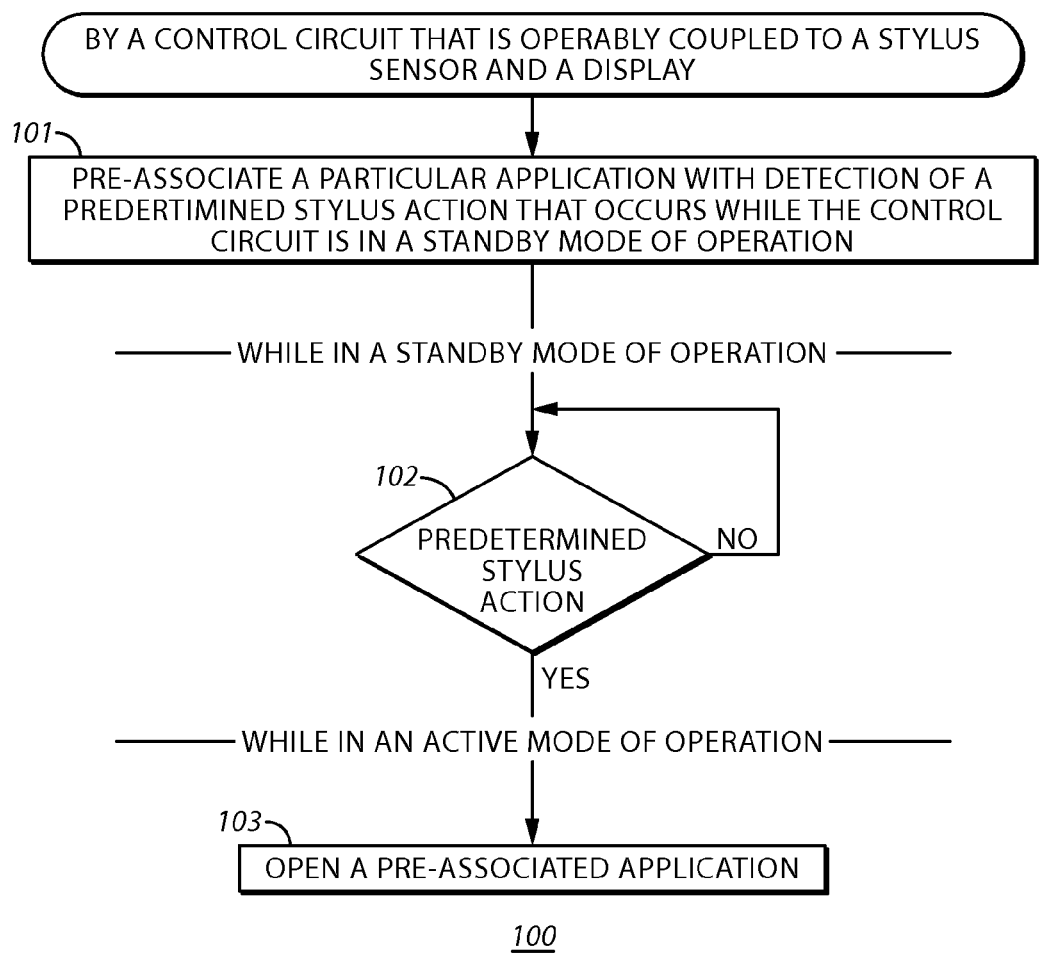
FIG. 1 is a flow diagram in accordance with the disclosure.

The following describes an apparatus and method pertaining to pre-associating a particular application with the detection of a predetermined stylus action that occurs while a given electronic device is in a standby mode of operation. Upon then detecting that predetermined stylus action these teachings provide for responsively opening that particular application. The foregoing action can occur, by one approach, regardless of whether another application was already open. By one approach this opening of the particular application occurs in conjunction with switching the electronic device from the standby mode of operation to the active mode of operation.

These teachings are flexible in practice. For example, these teachings will accommodate a variety of approaches to selecting the application to be pre-associated with the predetermined stylus action. By one approach, for example, the pre-association can be based, at least in part, upon an automatic association based upon identifying the most-used application for the electronic device. As another example, the pre-association can be based, at least in part, upon a specific user-based selection.

These teachings are also highly scalable and will accommodate use with a wide variety and number of applications, styli, stylus actions, and/or electronic devices. The stylus action itself can be statically defined or can, if desired, be used defined and assigned.

So configured, a user can awaken an electronic device from a standby mode of operation using a stylus. Upon awakening the electronic device as described, a particular application is then open and available for use by the user without requiring the user to first otherwise locate the application (for example, by searching through a plurality of application icons). This convenience can in turn greatly increase a user's productivity and sense of satisfaction.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
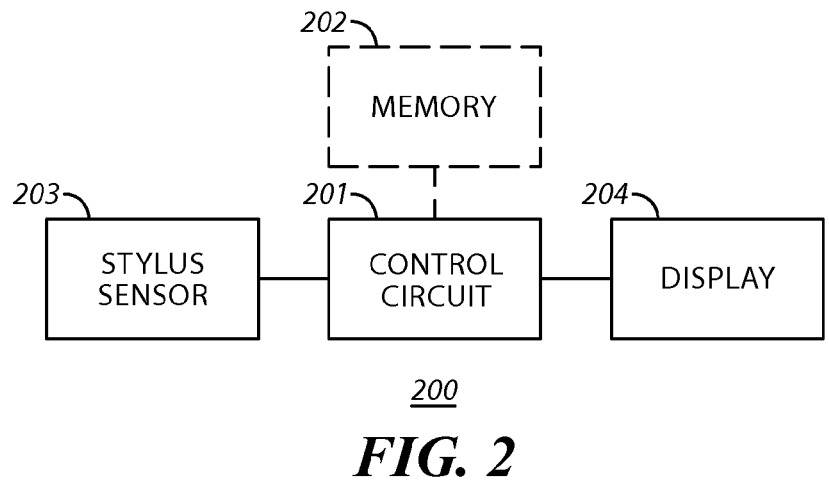
FIG. 2 is a block diagram in accordance with the disclosure.

FIG. 1 presents a process 100 that corresponds to many of the present teachings. By one approach a control circuit carries out this process 100. Referring momentarily to FIG. 2, this control circuit 201 can comprise a part of an apparatus 200 such as a portable electronic device of choice. This control circuit 201 has both an active mode of operation and a standby mode of operation.

Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

By one optional approach this control circuit 201 can operably couple to a memory 202. This memory 202 may be integral to the control circuit 201 or can be physically discrete (in whole or in part) from the control circuit 201 as desired. This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this illustrative example the control circuit 201 also operably couples to a stylus sensor 203 and a display 204. Various approaches are known in the art that serve to detect a present location of a stylus (often the scribing tip of the stylus) with respect to a scribing surface (such as the surface of a touch-screen display). As the present teachings are not overly sensitive to any particular selections in these regards, further elaboration will not be provided here regarding these various approaches for the sake of brevity. Similarly, a variety of display technologies are known in the art as well. And again, as the present teachings will accommodate use with any of a variety of display technologies further details are not provided here except as appropriate to the specifics of a given illustrative embodiment.

In a typical application setting the aforementioned control circuit 201 has ready access to a plurality of applications. Generally speaking, applications comprise computer software designed to help a user perform specific tasks. Examples include but are certainly not limited to enterprise software, accounting software, office suites, graphics software, image-capture software, games, and media players. An application may reside in its entirety within such an apparatus 200 (for example, within the memory 202) or may reside at least partially remote from the apparatus 200 (as when the application resides in the so-called cloud). It is presumed here that a user can select and open a given application by selecting a corresponding unique icon or menu entry for that application in accordance with well-understood prior art technique.

Referring again to FIG. 1, at 101 this process 100 provides for pre-associating a particular application with the detection of a predetermined stylus action that occurs while the control circuit 201 is in a standby mode of operation. By one approach, the user specifies the pre-association. For example, as part of running a set-up wizard for the apparatus 200 in general and/or when loading and installing a new application the user can be provided with an opportunity (via, for example, the above-mentioned display 204) to specify that a particular application is to be pre-associated with the aforementioned stylus action. So configured, and by way of example, a user could so pre-associate a word-processing application as being the particular application.

By another approach the pre-association can occur automatically. As one example in these regards the control circuit 201 can maintain at least some history regarding the number of times various applications are opened and/or the length of time that the user leaves such applications open. That information can then be used to identify, for example, a most-used application. The control circuit 201 can then, for example, pre-associate that most-used application with the aforementioned predetermined stylus action. Such an automated approach can be dynamically updated if desired using any schedule or trigger criterion of choice. For example, the pre-association can be automatically updated whenever a given application becomes the presently most-used application. By another approach such an assessment can occur per some schedule (such as on a daily, weekly, or monthly schedule).

The predetermined stylus action can comprise any of a wide variety of actions. (As used herein, the word "predetermined" will be understood to refer to a time prior to a current time of need.) For many application settings it will suffice if the predetermined stylus action comprises a tap of the stylus on the display 204. Other examples of possibly useful predetermined stylus actions would include a double-tap, triple-tap, or the like, a straight-line swipe, a swipe that scribes a specific shape such as a circle (clockwise or counter-clockwise as desired), and so forth.

Figure 3:
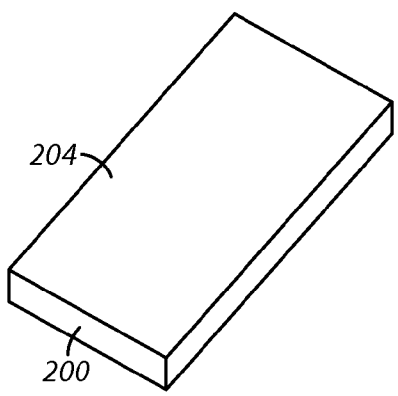
FIG. 3 is a perspective view in accordance with the disclosure.

Having made this pre-association, as some subsequent time the control circuit 201 enters its standby mode of operation. As illustrated in FIG. 3, during this standby mode of operation the display 204 may be dark and essentially powered down.

Figure 4:
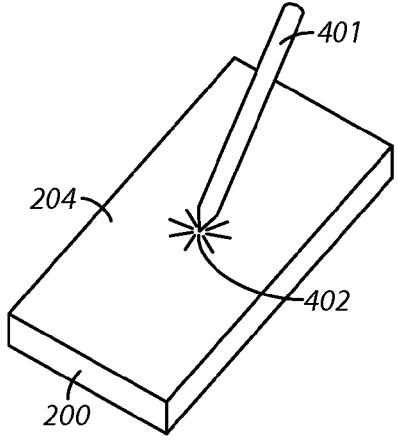
FIG. 4 is a perspective view in accordance with the disclosure.

Referring to both FIGS. 1 and 4, at 102 the control circuit 201 detects the aforementioned predetermined stylus 401 action (which, in this illustrative example, comprises a single tap 402 of the stylus 401 on the display 204). (Such an approach presumes, of course, that the control circuit 201 is configured to make a sufficient-enough use of the stylus sensor 203 while in the standby mode of operation to detect that stylus action.)

Figure 5:
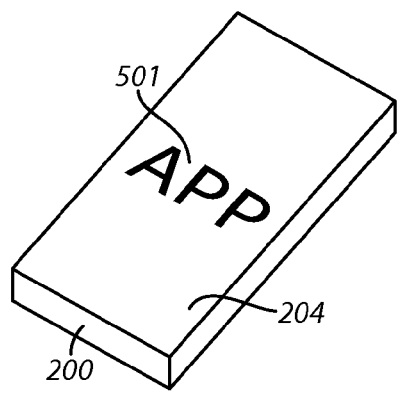
FIG. 5 is a perspective view in accordance with the disclosure.

Referring to FIGS. 1 and 5, at 103 the control circuit 201 then responds by opening the pre-associated application 501 that corresponds to the predetermined stylus action (typically in conjunction with switching from the standby mode of operation to the active mode of operation). So configured, and regardless of whatever application(s) might have been opened at the time the control circuit 201 switched to its standby mode of operation, the pre-associated application 501 is opened and now available to the user by having taken this one simple action.

Figure 6:
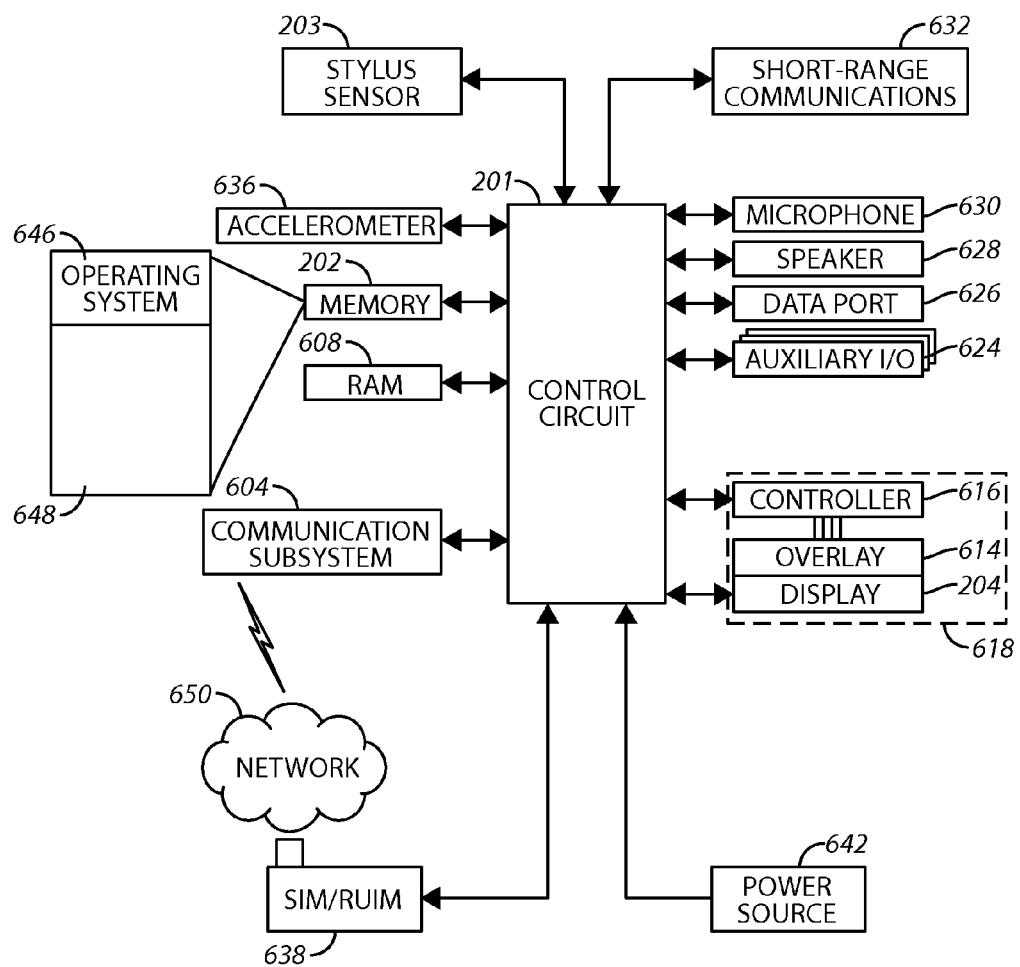
FIG. 6 is a block diagram in accordance with the disclosure.

As noted above the enabling apparatus 200 can comprise a portable electronic device. By one illustrative approach the portable electronic device comprises a portable communications device as shown in FIG. 6. Corresponding communication functions, including data and voice communications, are performed through a communication subsystem 604 that operably couples to the control circuit 201. The communication subsystem receives messages from and sends messages to a wireless network 650.

The wireless network 650 may be any type of wireless network, including, but not limited to, a wireless data networks, a wireless voice network, or a network that supports both voice and data communications. The control circuit 201 may also operably couple to a short-range communication subsystem 632 (such as an 802.11 or 802.16-compatible transceiver and/or a Bluetooth™-compatible transceiver). To identify a subscriber for network access, the portable electronic device may utilize a Subscriber Identity Module or a Removable User Identity Module (SIM/RUIM) card 638 for communication with a network, such as the wireless network 650. Alternatively, user identification information may be programmed into the aforementioned memory 202.

A power source 642, such as one or more rechargeable batteries or a port to an external power supply, powers the electronic device. The control circuit 201 may interact with an accelerometer 636 that may be utilized to detect direction of gravitational forces or gravity-induced reaction forces. The control circuit 201 also interacts with a variety of other components, such as a Random Access Memory (RAM) 608, an auxiliary input/output (I/O) subsystem 624, a data port 626, a speaker 628, a microphone 630, and the aforementioned stylus sensor 203.

The aforementioned display 204 can be disposed in conjunction with a touch-sensitive overlay 614 that operably couples to an electronic controller 616. Together these components can comprise a touch-sensitive display 618 that serves as a graphical-user interface. Information, such as text, characters, symbols, images, icons, and other items may be displayed on the touch-sensitive display 618 via the control circuit 201.

The portable electronic device includes an operating system 646 and software programs, applications, or components 648 that are executed by the control circuit 201 and are typically stored in a persistent, updatable store such as the memory 202. Additional applications or programs may be loaded onto the portable electronic device through the wireless network 650, the auxiliary I/O subsystem 624, the data port 626, or the short-range communications subsystem 632.

As a communication device, a received signal such as a text message, an e-mail message, or web page download is processed by the communication subsystem and input to the control circuit 201. The control circuit 201 processes the received signal for output to the display 204 and/or to the auxiliary I/O subsystem 624. A user may generate data items, for example e-mail messages, that may be transmitted over the wireless network 650 through the communication subsystem. For voice communications, the overall operation of the portable electronic device is similar. The speaker 628 outputs audible information converted from electrical signals, and the microphone 630 converts audible information into electrical signals for processing.

So configured, a portable electronic device (such as but not limited to a so-called smartphone or pad/tablet-styled computer) can support the aforementioned approach to permitting the user to awaken the device via a simple stylus action that also causes a particular, predetermined and pre-associated application to open as well. Such an approach can improve user productivity and satisfaction.

The present disclosure may be embodied in other specific forms without departing from its essential characteristics. For example, these teachings will accommodate specifying a plurality of different stylus actions and pre-associating a different application with each such action. So configured, and by way of example, the user might open an email application by employing a single tap and might open a camera application by employing a double tap.

The described embodiments are therefore to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
   a stylus sensor;
   a display;
   a control circuit operably coupled to the stylus sensor and the display, the control circuit having a standby mode of operation during which the display is dark and an active mode of operation, the control circuit being configured to:
   pre-associate a particular application with detection of a predetermined stylus action that occurs while the control circuit is in the standby mode of operation, where the pre-association of the particular application is an automatic association with the predetermined stylus action based upon identifying a most-used application for the apparatus;
   detect via the stylus sensor the predetermined stylus action while the control circuit is in the standby mode of operation and responsively open the particular application.

2. The apparatus of claim 1 wherein the predetermined stylus action comprises a tap of the stylus on the display.

3. The apparatus of claim 1 wherein opening the particular application comprises opening the particular application regardless of whether another application was already open.

4. The apparatus of claim 1 wherein the control circuit is configured to pre-associate the particular application with detection of the predetermined stylus action by identifying a most-used application based upon history of application usage information maintained for various applications.

5. The apparatus of claim 1 wherein the control circuit is configured to pre-associate the particular application with detection of the predetermined stylus action by providing a user with an opportunity to specify the particular application.

6. A method comprising:
   by a control circuit that is operably coupled to a stylus sensor and a display of an electronic device, and while in a standby mode of operation during which the display is dark:
   detecting via the stylus sensor a predetermined stylus action;
   responsively opening a pre-associated application, where the pre-association of the application is an automatic association with the predetermined stylus action based upon identifying a most-used application for the electronic device.

7. The method of claim 6 wherein the predetermined stylus action comprises a tap of the stylus on the display.

8. The method of claim 6 wherein opening the pre-associated application comprises opening the pre-associated application regardless of whether another application was already open.

9. The method of claim 6 further comprising:
   pre-associating the most-used application based upon history of application usage information maintained for various applications.

10. The method of claim 6 further comprising:
    pre-associating the application based upon a user association selection.

11. A non-transitory memory having computer instructions stored therein for causing a control circuit to:
    detect via a stylus sensor a predetermined stylus action while the control circuit is in a standby mode of operation during which a corresponding display of an electronic device is dark and responsively open a pre-associated application, where the pre-association of the application is an automatic association with the predetermined stylus action based upon identifying a most-used application for the electronic device.

12. The non-transitory memory of claim 11 wherein the predetermined stylus action comprises a tap of the stylus on a display.

13. The non-transitory memory of claim 11 wherein opening the pre-associated application comprises opening the pre-associated application regardless of whether another application was already open.

14. The non-transitory memory of claim 11 wherein the computer instructions further cause the control circuit to:
    pre-associate the most-used application based upon history of application usage information maintained for various applications.

15. The non-transitory memory of claim 11 wherein the computer instructions further cause the control circuit to:
    pre-associate the application based upon a user association selection.

\* \* \* \* \*